(12) United States Patent
Kawanishi

(10) Patent No.: US 6,707,586 B2
(45) Date of Patent: *Mar. 16, 2004

(54) OPTICAL FREQUENCY CONVERTER USING RECIPROCATING MODULATION

(75) Inventor: Tetsuya Kawanishi, Tokyo (JP)

(73) Assignee: Communications Research Laboratory, Independent Administrative Institution, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/886,251

(22) Filed: Jun. 22, 2001

(65) Prior Publication Data

US 2002/0027698 A1 Mar. 7, 2002

(30) Foreign Application Priority Data

Jun. 23, 2000 (JP) ........................... 2000-190215

(51) Int. Cl.[7] ............... G02B 26/00; G02F 1/01; G02F 1/03; G02F 1/07
(52) U.S. Cl. ...................... 359/238; 359/246
(58) Field of Search ................ 359/246, 238, 359/181, 309, 249, 239, 237, 245, 247, 251, 254, 261, 267, 276, 278, 279, 284, 300, 302, 308, 317, 318

(56) References Cited

U.S. PATENT DOCUMENTS 4,588,296 A * 5/1986 Cahill et al. ............ 356/350
5,040,865 A   8/1991 Chen et al. ............. 350/96
5,917,179 A * 6/1999 Yao ...................... 250/227

FOREIGN PATENT DOCUMENTS

| EP | 1 168 040 | 1/2002 |
| JP | 09-321700 | 12/1997 |
| JP | 10-206919 | 8/1998 |
| JP | 11-95184 | 4/1999 |

OTHER PUBLICATIONS

T. Kobayashi, Oyo Buturi, vol. 67, No. 9, pp. 1056–1060, "Generation Of Ultrashort Optical Pulses Using DomainInverted External Phase Modulator," 1998 (with partial English translation).

S. Inoue, General Meeting of The Institute of Electronics, Information and Communication Engineering, C–3–67, pp. 246–247, "Trends In Development Of Fiber Grating Technology," 2000 (with partial English translation).

Shomozu, et al., General Meeting of The Institute of Electronics, Information and Communication Engineers, C–3–20, p. 199, "Optical Subcarrier Generation Using Integrated LN Phase Modulator," 200 (with partial English translation).

Sasaki, et al., General Meeting of The Institute of Electronics, Information and Communication Engineers, C–3–125, p. 279, "60 GHz Band Resonance Type LiNbO$_3$ Optical Modulator," 2000 (with partial English translation).

* cited by examiner

Primary Examiner—Hung Xuan Dang
Assistant Examiner—Joseph P. Martinez
(74) Attorney, Agent, or Firm—Oblon, Spivak, McClelland, Maier & Neustadt, P.C.

(57) ABSTRACT

An optical frequency converter using reciprocating modulation includes a device that, taking n as a predetermined integer of 1 or more, modulates light of a predetermined frequency to produce an nth order sideband group thereof, a device that modulates the nth order sideband group to produce an (n+1)th order sideband group, and a device that selects a specific sideband from a plurality of sideband groups.

7 Claims, 4 Drawing Sheets

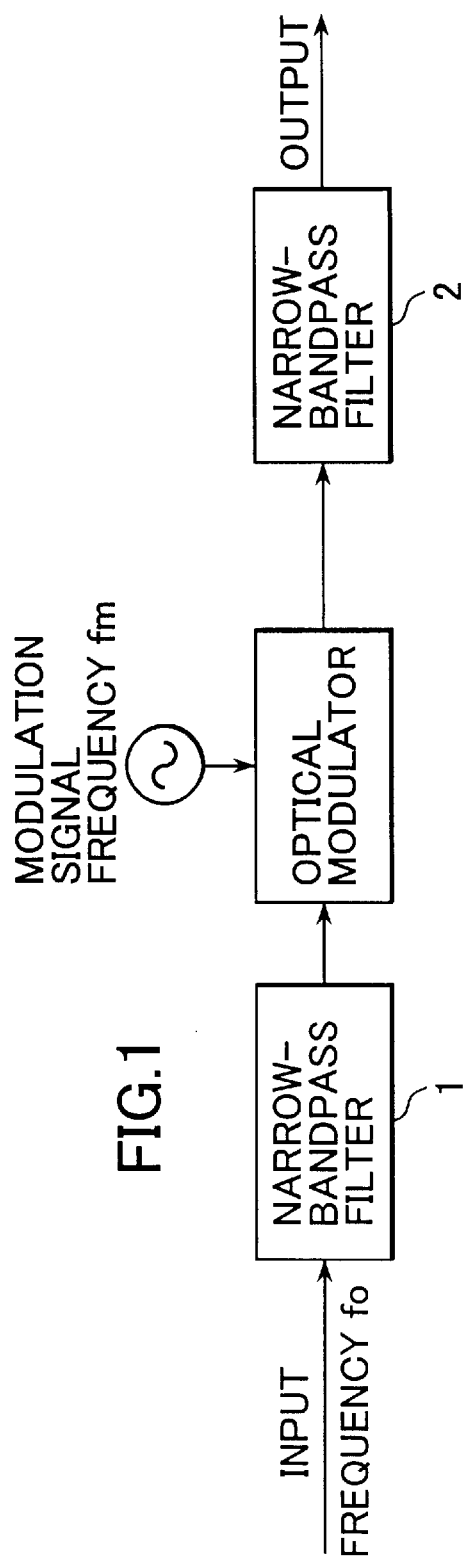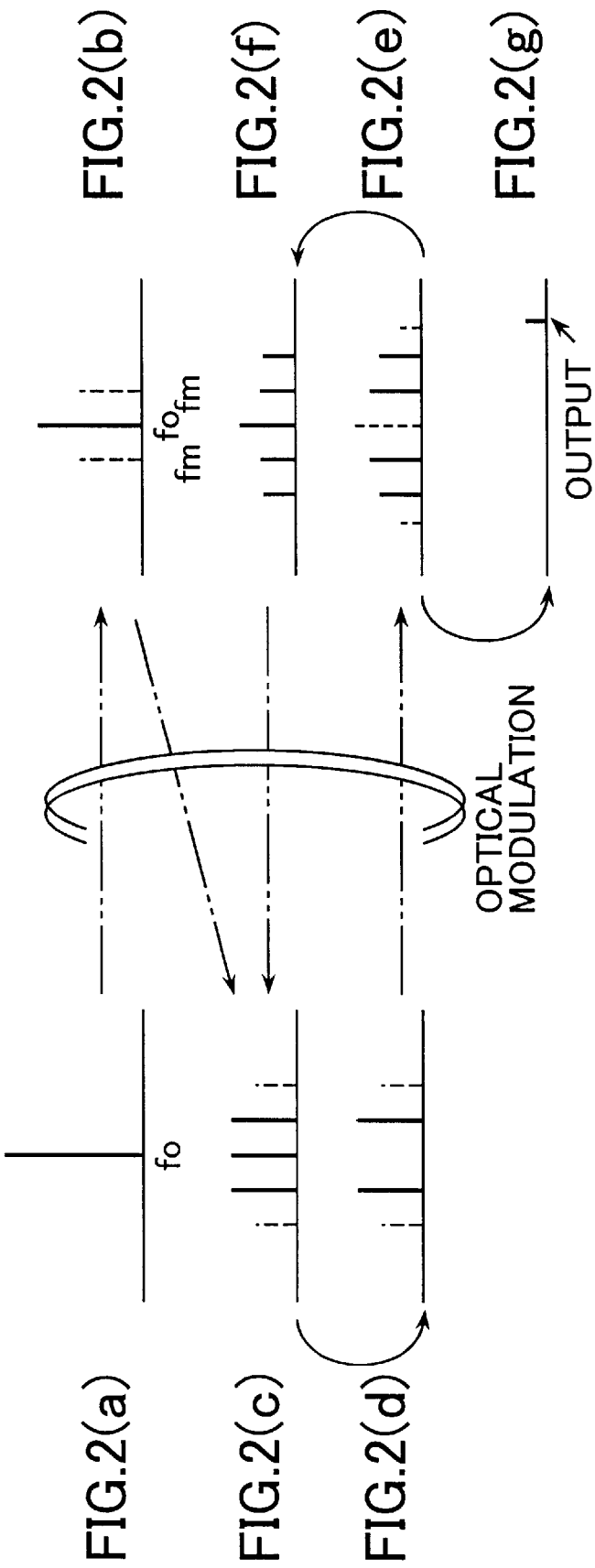

OPTICAL FREQUENCY CONVERTER USING RECIPROCATING MODULATION

BACKGROUND OF THE INVENTION

1. Field of the Invention

The present invention relates to an apparatus that uses high-frequency electrical signals to modulate optical signals, and particularly to an optical frequency converter using reciprocating modulation, that exhibits substantially the same effects as the case where optical modulation is conducted using a high-frequency signal having a frequency that is an integer of times higher than that of a high-frequency electrical signal.

2. Description of the Prior Art

There have heretofore been known apparatus for converting the frequency of light input using various methods. One of the methods is to project two kinds of laser beams onto a non-linear optical crystal to mix the beams. This method has already been known and is used when the frequency of a laser beam is to be doubled. Another method is to use a mode-locked laser. This method includes a process of generating optical pulses by equipping a laser resonator with an optical modulator, an isolator and a Fabry-Perot etalon, which process is also known as a process for generating a sideband having a high-order frequency fp that is Km times the phase modulation frequency fm (fp=Km·fm). Still another method is to convert an optical frequency by modulating a laser beam using a high-frequency signal to generate a sideband. The present invention is similar to the third-mentioned method and will be described hereinafter.

Optical modulation by highrequency signals is generally accomplished by inputting an optical carrier wave and a high-frequency electrical signal to an optical modulator and performing intensity modulation or phase modulation or other such modulation. In the case of this method, in order to obtain a sideband having a frequency that is at least as high as that of the applied high-frequency electrical signal, the high-frequency electrical signal is multiplied to form an even higher-frequency signal that is used for the optical modulation. However, even when the high-frequency electrical signal is thus multiplied, the maximum modulation frequency is determined by the upper limit of the electrical signal. Thus, in terms of frequency, an electrical signal that is multiplied or amplified or other such signal is limited by the maximum characteristic of the electrical circuit. However, there are cases where a high frequency exceeding the limited frequency is demanded as a modulation frequency. There is therefore a need to satisfy this demand.

There have been reports of attempts to produce a sideband with a frequency higher than that of the applied high-frequency signal, using phase modulation with a high modulation index. One Reference ("Generation of Ultrasort Optical Pulses Using Domain-Inverted External Phase Modulator," by T. Kobayashi, OYO BUTURI, Vol. 67 No. 9 (1998), pp. 1056–1060) describes applying a 16.26 GHz electrical signal to an optical modulator having a waveguide formed of an electro-optical crystal of $LiTaO_3$ on which a stripline resonator was disposed. With a modulation index set at 87 radian, the spectral bandwidth was around 2.9 THz.

In addition, U.S. Pat. No. 5,040,865 discloses a method for producing a high-frequency electrical signal by modulating monochromatic light with a high-frequency electrical signal using a modulator having non-linear characteristics to generate a high-order sideband and using a photodetector to detect an optical signal of the sideband. This also discloses a method comprising the steps of obtaining a first high-frequency electrical signal by the method mentioned above using a first modulator and applying the first high-frequency electrical signal to a second modulator to modulate it with a second high-frequency electrical signal. However, since the latter method uses an electrical signal obtained by multiplying a given high-frequency electrical signal, it is subject to restriction in relation to the frequency of an electrical circuit.

In order to generate a high-order sideband, it is necessary to obtain a high modulation index as was done in the phase modulation configuration of the aforementioned Reference. To obtain a high modulation index, a high-frequency electrical signal having large amplitude has to be used. In order to increase the amplitude of the modulation signal, a stripline resonator is used as the modulator electrodes, making it difficult to change the modulation frequency. In addition, it can be avoided to use a resonator as the modulation electrodes by using ordinary electrodes not having the resonance characteristic and amplifying a high-frequency electrical signal. Therefore, it is easy to think of a configuration making it possible to readily change the modulation frequency. However, it is well known that the amplifier using the modulation signal would place an upper frequency limit on the high-frequency electrical signal used as the modulation signal.

In view of the above, an object of the present invention is to provide an optical frequency converter using reciprocating modulation to obtain a high-order sideband even when modulation is performed using a high-frequency electrical signal having a smaller amplitude than in the conventional configuration that uses, as the principle of operation, the phase modulation adopting a high modulation index.

SUMMARY OF THE INVENTION

To attain the above object, the present invention provides an optical frequency converter using reciprocating modulation, comprising: means that, taking n as a predetermined integer of 1 or more, modulates light of a predetermined frequency to produce an nth order sideband group thereof, means that modulates the nth order sideband group to produce an (n+1)th order sideband group; and means that selects a specific sideband from a plurality of sideband groups. Here, "nth order sideband" refers to a sideband that is frequency-separated by n-times the modulation frequency from the carrier wave, and the "nth order sideband group" refers to two sidebands located symmetrically with respect to the carrier wave.

The optical frequency converter of the present invention also includes reflection means used to fold a light path for the light of the predetermined frequency and the modulated light. It can further includes one or more modulation means for modulating the light of the predetermined frequency, to one of which a sideband group of a different order is input, whereby the number of modulators used is decreased to reduce the cost of the converter.

The converter can further include first reflection means that prior to modulation passes light of a predetermined frequency and reflects part of light of other frequencies and second reflection means that with respect to a predetermined integer n of 1 or more, passes (n+1)th sidebands and reflects part of other light. It can further include a laser light source and an optical modulator, wherein the first reflection means comprises a first narrow-bandpass filter and the second reflection means comprises a second narrow-bandpass filter. It can further include a phase modulator for further modulating the signal. Moreover, it can further include means for converting part of the optical output into electrical signals and means for re-inputting the electrical signals to the modulation signal of the phase modulator.

The above and other objects, further features of the invention, its nature and various advantages will be more apparent from the accompanying drawings and following detailed description of the invention.

BRIEF DESCRIPTION OF THE DRAWINGS

FIG. 1 is a block diagram of the basic configuration of an optical frequency converter using reciprocating modulation according to the present invention and shows the principle of operation thereof.

FIG. 2 is an explanatory view showing the change of a sideband generated by modulation, with spectra of a newly generated sideband shown by dots.

DESCRIPTION OF THE PREFERRED EMBODIMENT

The invention will now be described with reference to an embodiment shown in the accompanying drawings.

The principle of the present invention will first be described with reference to FIGS. 1 and 2. FIG. 1 is a block diagram showing the principle of operation of the present invention and shows the basic configuration of an optical frequency converter using reciprocating modulation, and FIG. 2 shows the change of a sideband generated by modulation in the configuration of FIG. 1, in which spectra of a sideband newly generated are shown in dots.

In FIG. 1, the light that is input has a frequency $f_0$. A narrow-bandpass filter 1 allows this input light of frequency $f_0$ to pass therethrough, but reflects light having frequency that deviates even slightly from that frequency. The narrow-bandpass filter 1 is therefore used as a reflection means. An optical modulator is an intensity modulator that can modulate left and right oriented light with a same modulation frequency fm. A narrow bandpass filter 2 passes light of third order sideband frequency and reflects other light. Therefore, the bandpass filter 2, too, is used as a reflection means.

With the aforementioned configuration, light of frequency $f_0$ in FIG. 2(a) input after passing through a narrow-bandpass filter 1 is modulated, resulting in a sideband shown in FIG. 2(b). For simplicity, it is assumed that linear modulation is conducted to generate a carrier wave and a first-order sideband group. A narrow-bandpass filter 2 reflects the carrier wave and first-order sideband group back through the optical intensity modulator. This subjects them to modulation, creating spectra shown in FIG. 2(c). The carrier wave portion of the light passes through the narrow-bandpass filter 1, leaving just the sideband depicted in FIG. 2(d), which is reflected and further modulated, resulting in the spectrum of FIG. 2(e). Thus, this modulation process produces first-order and third-order sidebands. The high-frequency third-order sideband, shown in FIG. 2(g), passes through the narrow-bandpass filter 2, while the first-order sideband shown in FIG. 2(f) is reflected thereby. In this way, the input light of frequency three times higher than that of the high-frequency electrical signal is output from the narrow-bandpass filter 2.

The above description has been made with reference to the intensity modulator. However, the same effect is also obtained with a phase modulator. Modulators that can be used for the purposes of the present invention include resonance type modulators and traveling wave type modulators. A traveling wave modulator has electrodes at both ends, meaning that a modulation signal can be input from either end, enabling the same modulation to be imparted to the light whichever way the light is traveling.

Figure 3:
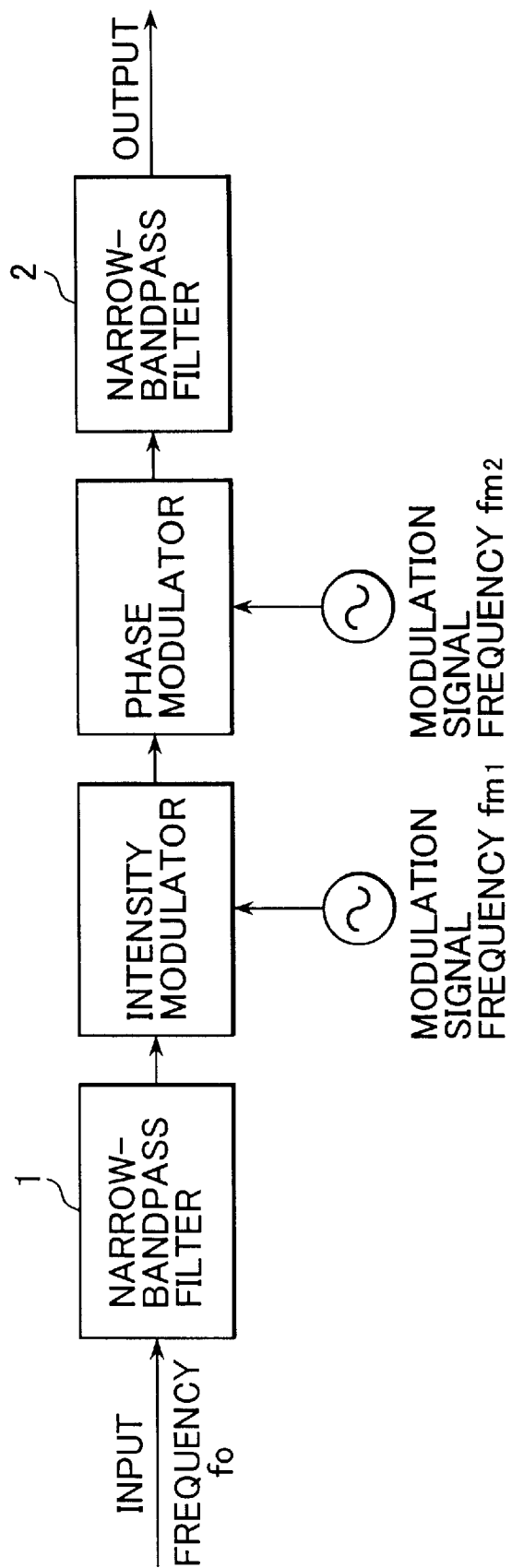
FIG. 3 is a block diagram of the fundamental principle of the optical frequency converter using improved reciprocating modulation according to the present invention.

FIG. 3 is a block diagram showing a variation of the optical frequency converter configuration shown in FIG. 1. Specifically, a phase modulator has been added to the system of FIG. 1. The input light of frequency $f_o$ passes through the narrow-bandpass filter 1 and is modulated with the modulation frequency $f_{m1}$ by the intensity modulator. The modulated light is phase-modulated with the modulation frequency $f_{m2}$ by the phase modulator. The phase-modulated light is input to the narrow-bandpass filter 2. The effect of the narrow-bandpass filter is the same as that in the configuration of FIG. 1. That is to say, the narrow-bandpass filter passes light of third sideband frequency, and reflects light of the order sideband frequency. The phase modulator can be made to perform amplitude modulation by a change in the interference conditions made by changing the phase of the light reflected in an optical resonator comprising the narrow-bandpass filters 1 and 2. The optical output can be intensity-modulated by supplying the phase modulator with a modulation signal of a different frequency from the modulation frequency $f_{m1}$.

Figure 4:
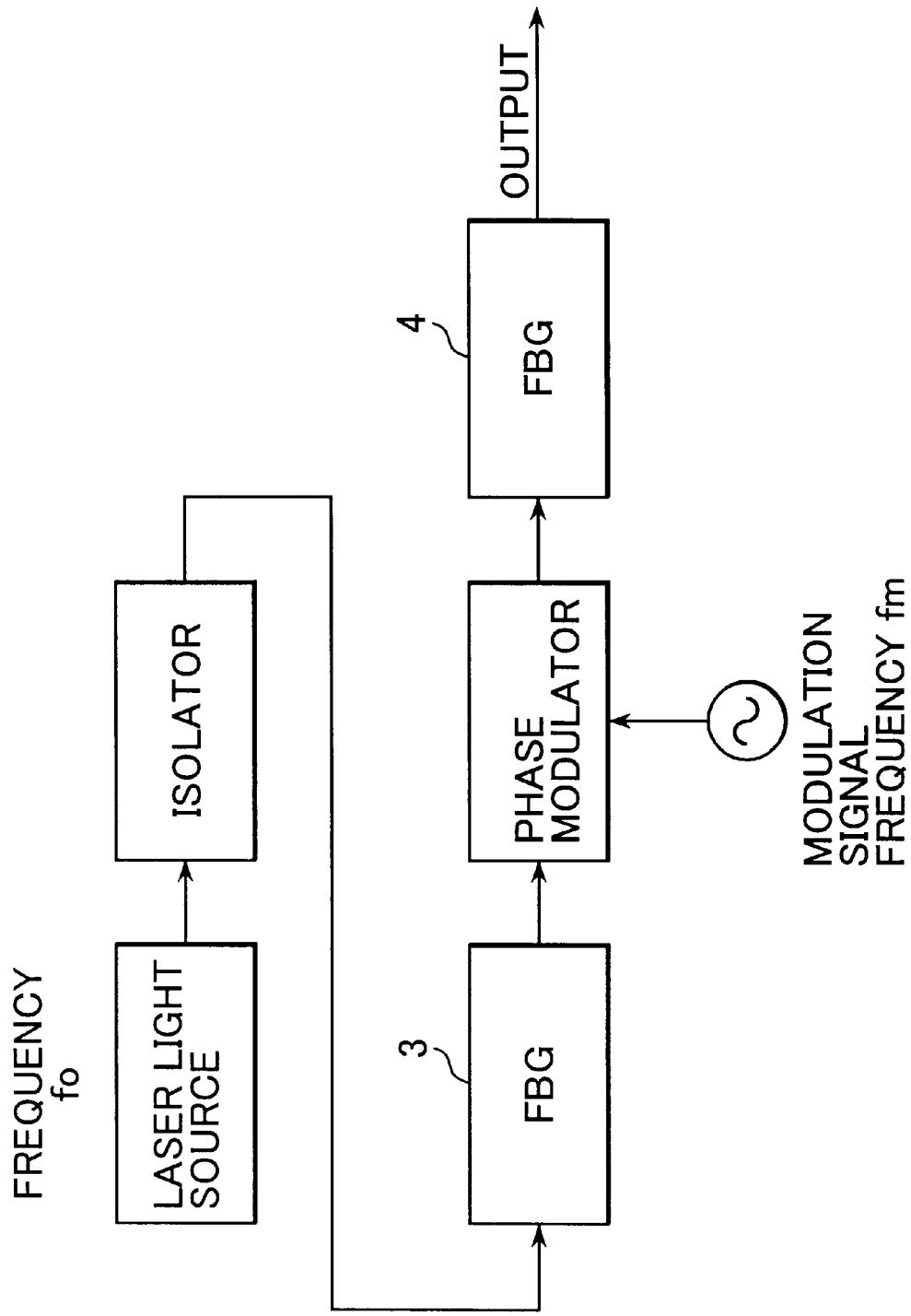
FIG. 4 is a block diagram showing an experiment verifying the principle of the optical frequency converter using improved reciprocating modulation according to the present invention.

FIG. 4 is a block diagram of an experimental configuration used to verify the principle of the present invention. Reflection by fiber gratings (FBG) 3 and 4 causes the light input to be passed through the phase modulator a plurality of times, generating a high-order sideband A laser light source is a 10-milliwatt semiconductor laser that operates at a wavelength of 1550 nanometers. An isolator is of a commercially available type manufactured by Newport Company. The fiber gratings 3 and 4 are also of a commercially available type made by 3M Company. This type of the fiber gratings is described, for example, in "Trends in the Development of Fiber Grating Technology," by Akira Inoue, C-3-67, 2000 General Meeting of The Institute of Electronics, Information and Communication Engineers, pp. 246-247. The modulator is a commercially available traveling wave type phase modulator manufactured by Sumitomo Osaka Cement Co., Ltd, that can handle high-frequency electrical signal inputs having a frequency of up to 40 GHz. With this configuration, it was possible to obtain a −32 dBm sideband with a carrier frequency separation of 210 GHz, from the input of a 30 GHz, 27.8 dBm modulation signal.

Figure 5:
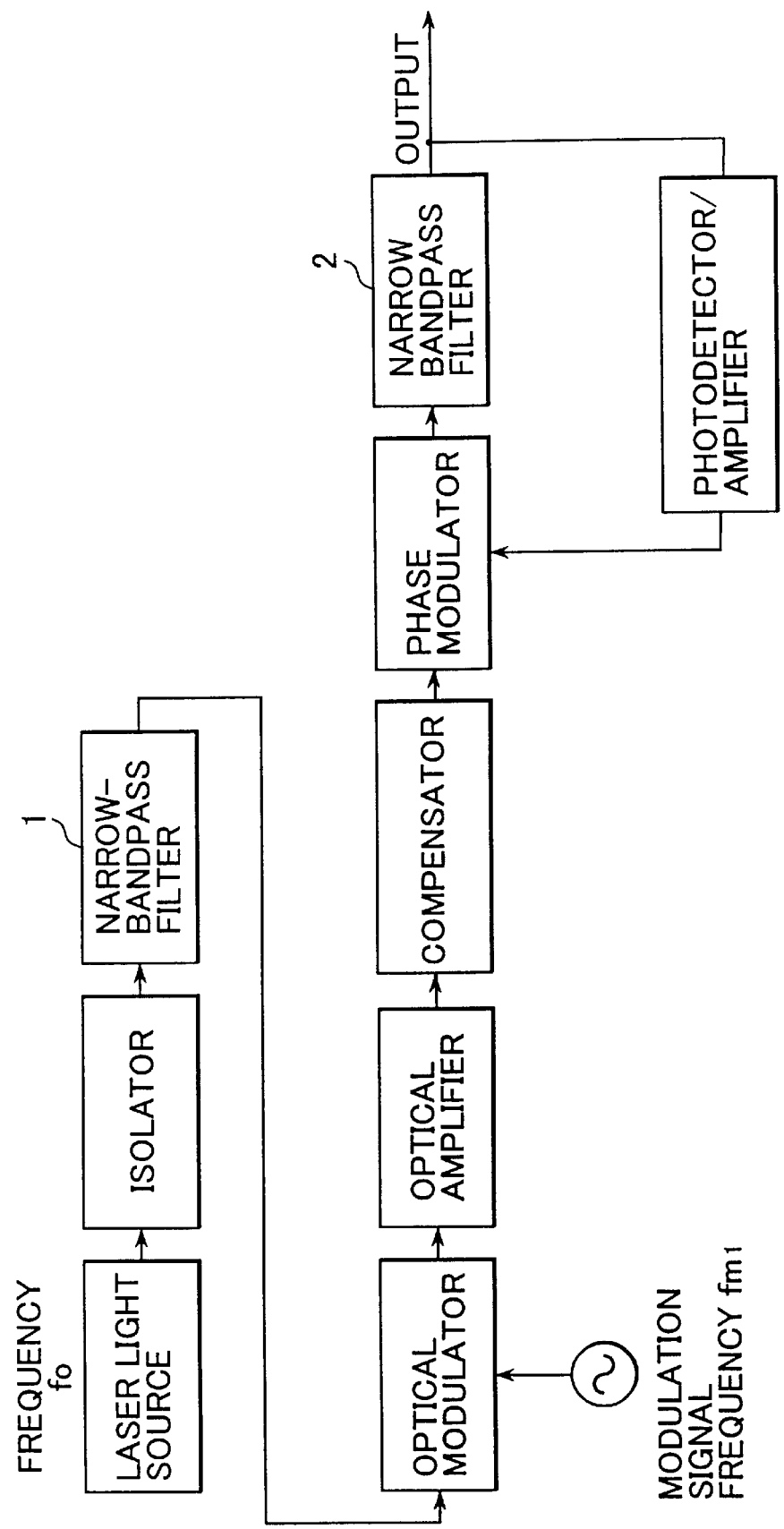
FIG. 5 is a block diagram showing a preferred embodiment of the optical frequency converter using improved reciprocating modulation according to the present invention.

FIG. 5 shows the arrangement of a first embodiment of the optical frequency converter of the present invention. This converter is provided with an isolator to suppress the effect of light returning back from the narrow-bandpass filter 1, a dispersion compensator for preventing the efficiency of the reciprocating modulation from decreasing even at high-order sideband frequencies, and an optical amplifier for obtaining a high output. The compensator compensates for dispersion arising in the other components. It is possible to dispense with the compensator by equipping the other converter components with this function.

The intensity of the optical output generally fluctuates. However, the output can be kept stable by, for example, using a photodiode to convert the optical output to an electrical signal that is fed back to the phase modulator. This is because the fluctuations in the intensity of the optical output are caused by variations in the phase of the light arising from variations in the light path and because the fluctuation of the optical output can be suppressed by compensating for the variations.

In the narrow-bandpass filter 2, it is desired to control the transparent spectral characteristic externally, ie. via voltage, current, temperature, magnetic field, pressure, electromagnetic wave, or the like. From this standpoint, the wavelength variable filter described in JP-A-HEI 11-95184 can be used as the narrow-bandpass filter 2.

Instead of the phase modulator, a modulator can be used that attenuates the carrier wave, leaving both sideband groups, such as the modulator described in "Optical Subcarrier Generation Using Integrated LN Phase Modulator," by Shimozu et al., C-3-20, 2000 General Meeting of The Institute of Electronics, Information and Communication Engineers, p. 199. A semiconductor-based absorption modulator, a Mach-Zehender interference type intensity modulator or an electro-optic-effect phase modulator can be used for the modulator.

Modulation index can be readily improved by using resonance type intensity and phase modulators that perform the modulation by using electrodes that resonate at the modulation frequency. As can be readily understood, this means that sufficient modulation can be obtained using just a small amount of high-frequency power. The properties of a resonance type modulator are described in "60 GHz Band Resonance Type $LiNbO_3$ Optical Modulator," by Sasaki et al., C-3-125, 1999 General Meeting of The Institute of Electronics, Information and Communication Engineers, p. 279.

In the above-described modulator, as long as the optical amplifier is between the narrow-bandpass filters 1 and 2, the precise position has no particular significance. Similarly, there is no particular significance attached to the order in which the modulator, optical amplifier, compensator and phase modulator are arranged, because the same effect is obtainable even if a different order is used.

Below is described the effectiveness of the converter of the present invention having the configuration explained in the foregoing.

The optical frequency converter of the present invention comprises means that, taking n as a predetermined integer of 1 or more, modulates light of a predetermined frequency to produce a group of an nth order sideband group thereof, means that modulates the nth order sideband group to produce an (n+1)th order sideband group; and means that selects a specific sideband from the nth and (n+1)th order sideband groups. By thus easing constraints with respect to electrical circuit performance, this makes it possible to obtain high-order sidebands in a planned way.

The converter further includes reflection means used to fold a light path for the light of the predetermined frequency and the modulated light, making it possible to configure the converter with a short light path.

The converter further includes one or more modulation means for modulating the light of the predetermined frequency, to one of which a sideband group of a different order is input, which makes it possible to reduce the manufacturing cost by decreasing the number of modulators used.

The converter further includes first reflection means that prior to modulation passes the light of the predetermined frequency and reflects part of light of other frequencies and second reflection means that with respect to a predetermined integer n of 1 or more, passes (n+1)th sidebands and reflects part of other light. This enables an optical frequency converter to be readily configured using a filter that is transparent to a portion of the light to form an optical resonator.

The converter further includes a laser light source and an optical modulator, wherein the first reflection means comprises a first narrow-bandpass filter, and the second reflection means comprises a second narrow-bandpass filter, reducing the cost.

The converter fixer includes a phase modulator, facilitating the modulation of the frequency-modulated optical signal.

The converter further includes means for converting part of an optical output into electrical signals and means for re-inputting the electrical signals to a modulation signal of the phase modulator, which makes it possible to readily obtain a stable frequency-converted optical signal with small time fluctuation.

What is claimed is:

1. An optical frequency converter using reciprocating modulation, comprising:

means for, taking n as a predetermined integer of 1 or more, modulating light of a predetermined frequency to produce an nth order sideband group thereof;

means for modulating the nth order sideband group to produce an (n+1)th order side band group; and means for selecting a specific sideband from a plurality of sideband groups including the nth and (n+1)th order sideband group.

2. The optical frequency converter according to claim 1, further comprising means for reflecting to fold a light path for the light of the predetermined frequency and the modulated light.

3. The optical frequency converter according to claim 2, further comprising one or more means for modulating the light of the predetermined frequency, to one of which a sideband group of a different order is input.

4. The optical frequency converter according to claim 3, further comprising first means for reflecting, prior to modulation passes the light of the predetermined frequency and reflects part of light of other frequencies; and second means for reflecting that, with respect to a predetermined integer n of 1 or more, passes (n+1)th sidebands and reflects part of other light.

5. The optical frequency converter according to claim 4, further comprising a laser light source and an optical modulator, wherein the first means for reflecting comprises a first narrow-bandpass filter and the second means for reflecting comprises a second narrow-bandpass filter.

6. The optical frequency converter according to claim 5, further comprising a phase modulator.

7. The optical frequency converter according to claim 6, further comprising means for converting part of an optical output into electrical signals and means for re-inputting the electrical signals to a modulation signal of the phase modulator.

* * * * *